United States Patent [19]

Dudacek et al.

[11] Patent Number: 4,491,483

[45] Date of Patent: Jan. 1, 1985

[54] HOT-WATER DISPERSIBLE STARCH-SURFACTANT PRODUCTS, INCLUDING ACID STABLE AND ACID AND FREEZE-THAW STABLE FOOD THICKENERS

[75] Inventors: Wayne E. Dudacek, La Grange; David A. Kochan; Henry F. Zobel, both of Darien, all of Ill.

[73] Assignee: CPC International Inc., Englewood Cliffs, N.J.

[21] Appl. No.: 506,752

[22] Filed: Jun. 22, 1983

Related U.S. Application Data

[63] Continuation-in-part of Ser. No. 307,550, Oct. 1, 1981, abandoned, and a continuation-in-part of Ser. No. 307,551, Oct. 1, 1981, abandoned.

[51] Int. Cl.$^3$ .............................................. A23L 1/195
[52] U.S. Cl. ..................................... 127/33; 127/71; 426/661
[58] Field of Search .................. 426/661, 654; 127/32, 127/33, 70, 71, 69, 65; 106/210

[56] References Cited

U.S. PATENT DOCUMENTS

| | | | |
|---|---|---|---|
| 3,391,003 | 7/1968 | Armstrong et al. | 426/285 |
| 3,443,990 | 5/1969 | Decnop | 127/33 |
| 3,537,893 | 11/1970 | Hauser et al. | 127/71 |
| 3,554,764 | 1/1971 | Yoder et al. | 426/573 |
| 3,563,798 | 2/1971 | Germino et al. | 127/70 |
| 3,578,497 | 5/1971 | Hjermstad | 127/32 |
| 3,582,350 | 6/1971 | Katz | 426/578 |
| 3,783,139 | 1/1974 | Moneymaker | 127/70 |
| 3,917,875 | 11/1975 | Gardiner | 426/573 |
| 4,013,799 | 3/1977 | Smalligan et al. | 426/578 |
| 4,081,566 | 3/1978 | Haber | 426/578 |
| 4,081,567 | 3/1978 | Haber | 426/578 |
| 4,105,461 | 8/1978 | Racciato | 106/205 |
| 4,119,564 | 10/1978 | Van Dam | 252/8.55 D |
| 4,120,986 | 10/1978 | Lynn | 426/549 |
| 4,140,808 | 2/1979 | Jonson | 426/583 |
| 4,192,900 | 3/1980 | Cheng | 426/579 |
| 4,235,939 | 11/1980 | Kimberly | 426/661 |
| 4,260,642 | 4/1981 | Mitchell et al. | 426/579 |

FOREIGN PATENT DOCUMENTS

| | | |
|---|---|---|
| 863203 | 2/1971 | Canada ................ 127/70 |
| 0011479 | 5/1980 | European Pat. Off. . |
| 739632 | 6/1930 | Fed. Rep. of Germany . |
| 619984 | 3/1931 | Fed. Rep. of Germany . |
| 629798 | 6/1931 | Fed. Rep. of Germany . |
| 725967 | 12/1931 | Fed. Rep. of Germany . |
| 2305864 | 8/1973 | Fed. Rep. of Germany . |
| 498198 | 10/1970 | Switzerland . |
| 1479515 | 7/1977 | United Kingdom . |

OTHER PUBLICATIONS

"Starch: Chemistry & Technology", Whistler & Paschall Eds., vol. II, Chap. VII, pp. 179–181 & vol. II, Chap. VIII, pp. 189–191, by E. M. Osman, Academic Press, NY, (1967).

"Effects of Surfactants & Fatty Adjuncts on the Swelling & Solubilization of Granular Starches", V. M. Gray & T. J. Schoch, Die Stärke 14 (7), 239–246, (1962).

"Influence of Food Emulsifiers on Pasting Temperature & Viscosity of Various Starches", N. Krog, Die Stärke 25 (1), 22–27, (1973).

"Methods in Carbohydrate Chemistry", R. J. Whistler Ed., vol. IV, pp. 283–285, by Louis Sair, Academic Press, NY, (1964).

"Influence of Monoglycerides on the Gelatinization & Enzymatic Breakdown of Wheat & Cassava Starch", H. Van Lonkhuysen & J. Blankestijin, Die Stärke 28 (7), 227–233, (1976).

"Effect of Surfactants on Starch in a Model System", by Y. J. Kim & R. J. Robinson, Die Stärke 31 (9), 293–300, (1979).

"Inclusion Complexes of Free Fatty Acids with Amylose", T. Davies, D. C. Miller, A. A. Procter, Stärke 32 (5), 149–158, (1980).

"Characterization of Potato Starch & Its Monoglyceride Complexes", R. Hoover & D. Hadziyev, Stärke 33 (9), 290–300, (1981).

"Heat-Moisture Treatment of Starch", L. Sair, Cereal Chem. 44, 8–25, (1967).

"Heat-Moisture Treatment of Starches, I. Physicochemical Properties", K. Kulp & K. Lorenz, Cereal Chem. 58 (1), 46–48, (1981).

"Heat-Moisture Treatment of Starches, II. Functional Properties & Baking Potential", K. Kulp & K. Lorenz, Cereal Chem. 58 (1), 49–52, (1981).

Primary Examiner—Peter Hruskoci

[57] ABSTRACT

A hot-water dispersible starch-surfactant product and process for preparing the same is disclosed wherein a blend of granular starch and at least about 0.25% by starch weight of a surfactant containing a fatty acid moiety are subjected to heat-moisture treatment. Heat-moisture treatment is carried out at from about 10% to about 40% by total weight at a temperature from about 50° C. to about 120° C. Also disclosed are acid stable food thickeners obtained by blending the starch surfactant product with one or more gums in the amount of from about 0.5% to about 10% by total weight.

5 Claims, No Drawings

HOT-WATER DISPERSIBLE STARCH-SURFACTANT PRODUCTS, INCLUDING ACID STABLE AND ACID AND FREEZE-THAW STABLE FOOD THICKENERS

This is a continuation-in-part application combining and claiming priority of both U.S. patent application Ser. No. 307,550, filed Oct. 1, 1981, now abandoned and U.S. patent application Ser. No. 307,551, also filed Oct. 1, 1981 now abandoned.

FIELD OF THE INVENTION

This invention relates to the preparation of hot-water dispersible starch-surfactant products, including acid stable and acid and freeze-thaw stable food thickeners.

BACKGROUND OF THE INVENTION

Starches are widely used in food applications as thickeners or bodying agents. They are unique among carbohydrates in occurring as discrete granules. In modern day food processing and storage applications, however, the properties of granular starch must be modified to withstand certain heat, acid and freeze-thaw conditions.

When granular starch is heated in excess water above the gelatinization temperature, it undergoes hydration and gelatinizes, forming a viscous solubilized paste. In practice, starch granules require dispersion in cold water before cooking at the time of use.

Recently, pregelatinized starch products have been developed that provide reconstituted pastes when mixed with hot or cold water. The starch manufacturer gelatinizes the granular starch and then dehydrates the gelatinized starch by such techniques as roll-drying or spray-drying and the like. Unfortunately, the dried pregelatinized starch product does not readily disperse in hot water and agglomerated masses are formed giving lumpy pastes with inconsistent paste viscosities.

Attempts have been made to circumvent the dispersibility problem by inclusion of surfactants with dried pregelatinized starch and somewhat improved dispersibilities were obtained as exemplified in U.S. Pat. Nos. 3,537,893; 3,582,350; 3,443,990 and 4,260,642. The effect of surfactants on starch pastes is also described by E. M. Osman In Starch; Chemistry & Technology, Vol. II, Chapter VII, pp. 189-191; Whistler & Paschall Eds., Academic Press, N.Y. (1967).

Free-flowing, agglomerated, heat-moisture treated starch products have been developed and used in food applications, as shown in Great Britain Pat. No. 1,479,515; U.S. Pat. Nos. 3,391,003; 3,578,497; 4,013,799; and German Reich Pat. Nos. 619,984; 629,798; 725,967; and 739,632.

The term "heat-moisture treated starch" is well known in the art and is commonly used to refer to a starch which has been subjected to a heat treatment under controlled moisture conditions, the conditions being such that the starch undergoes neither gelatinization (i.e. exhibits no substantial loss of birefringence) or dextrinization as discussed by Louis Sair in Methods in Carbohydrate Chemistry, Vol. IV, pp, 283-285, R. J. Whistler, Ed., Academic Press, N.Y. (1964) and by E. M. Osman in Starch: Chemistry & Technology, Vol. II, Chap. VII, pp. 179-181, Whistler & Paschall, Eds., Academic Press, N.Y. (1967). If heat-moisture treated starches are used in hot-water dispersible foodstuffs, dispersion of the mix into boiling water, nevertheless, results in formation of lumps and agglomerated or coated masses by surface gelatinization wherein a coating barrier forms on the starch preventing further hydration.

For improved convenience, a hot or boiling water dispersible starch product that consistently provides a uniform paste having no lumps or agglomerated masses associated therewith is desirable. A hot or boiling water dispersible starch thickener is particularly desirable for food products prepared in the home so that the consumer does not have to follow cumbersome cooking procedures often associated with the available starch containing sauces and gravies. In this invention, an improved starch-surfactant complex is provided that consistently provides complete dispersibility in hot or boiling water.

The combination of starch and gums or starch, gums and emulsifiers is generally known (see U.S. Pat. Nos. 3,917,875; 4,081,566; 4,081,567; 4,105,461; 4,119,564; 4,120,986; 4,140,808 and 4,192,900). The gums are used as thickeners or stabilizers in these formulations. Nevertheless, food formulations prefer to use as much starch as possible in these products due to the high cost of gums. The nature and use of gums is more fully described in Industrial Gums: Polysaccharides and Their Derivatives, Roy L. Whistler Ed., Academic Press, N.Y. (1959).

Starch derivatives have been developed for use in canned food products that require delayed gelatinization and resistance to heat, such as in cream style vegetables and for use in acid food systems, such as pie fillings, salad dressings and the like. Because of the severe acid and/or heat conditions encountered, these starch products were cross-linked and chemically derivatized to produce starch esters and starch ethers that were resistant to these conditions as disclosed in U.S. Pat. Nos. 3,238,193; 3,376,287; 3,422,088; 3,699,095; 3,555,009; 3,553,195; 3,751,410; 3,804,828 and 3,832,342. These products are expensive and require difficult preparation procedures.

It is highly desirable to have a starch-based product suitable for use as a food thickener in canned food products and acid food systems that would be both acid stable and heat stable. It is also desirable if the starch product at the same time possesses freeze-thaw stability. It would be most desirable if the starch-based food product having these properties could be made by a simple procedure that did not require expensive and cumbersome chemical derivatization of starch. In this invention a starch-surfactant-gum product which has these desired properties is provided by a simple physiochemical process.

SUMMARY

In accordance with this invention, a process is provided for preparing a hot-water dispersible modified starch product comprising the steps of combining granular starch with at least about 0.25% by starch weight of a surfactant containing a fatty acid moiety and sufficient water to provide a moisture content of from about 10% to about 40% by total weight to form a semi-moist granular starch and surfactant blend and heat-treating said blend at a temperature of from about 50° C. to about 120° C. to produce a heat-moisture treated starch-surfactant product. To produce an acid stable product, this starch-surfactant is then further prepared by blending the starch-surfactant complex with from about 0.5% to about 10% by total weight of one or more gums selected from the group consisting of xanthan, guar, locust bean, alginate, carrageenan, ghatti or karaya to obtain said acid stable starch based food thickener product.

The instant invention is also directed to a heat-moisture treated starch-surfactant product characterized as having hot water dispersibility of from about 60% to about 100% and a higher relative pasting temperature than the granular starch from which it is derived.

Moreover, the hot, water dispersible heat-moisture treated starch-surfactant complex of the instant invention can be dispersed directly into hot or boiling water and cooked to form a paste or sauce.

In another embodiment, the instant invention is directed to a process for preparing an acid and freeze-thaw stable tapioca starch based food thickener product which comprises combining granular tapioca starch and a surfactant containing a fatty acid moiety and sufficient water to provide a moisture content from about 10% to about 40% by total weight to form a semi-moist granular starch and surfactant mixture, heat-treating said mixture at a temperature from about 50° C. to about 120° C. to produce a heat-moisture treated starch-surfactant complex and blending the starch-surfactant complex with from about 1 to about 10% by total weight of one or more gums selected from the group consisting of xanthan, guar, locust bean, alginate, carrageenan, ghatti or karaya to obtain said acid and freeze-thaw stable starch based food thickener product.

The instant invention is also directed to a heat-moisture treated starch-surfactant product characterized as having hot water dispersibility of from about 60% to about 100% and a higher relative pasting temperature than the granular starch from which it is derived.

Moreover, the hot-water dispersible heat-moisture treated starch-surfactant complex of the instant invention can be dispersed directly into hot or boiling water and cooked to form a paste or sauce.

In another embodiment, the instant invention is directed to a process for preparing an acid and freeze-thaw stable tapioca starch based food thickener product which comprises combining granular tapioca starch and a surfactant containing a fatty acid moiety and sufficient water to provide a moisture content from about 10% to about 40% by total weight to form a semi-moist granular starch and surfactant mixture, heat-treating said mixture at a temperature from about 50° C. to about 120° C. to produce a heat-moisture treated starch-surfactant complex and blending the starch-surfactant complex with from about 1 to about 10% by total weight of one or more gums selected from the group consisting of xanthan, guar, locust bean, alginate, carrageenan, ghatti or karaya to obtain said acid and freeze-thaw stable starch based food thickener product.

The instant invention is also directed to an acid and freeze-thaw stable tapioca starch product produced by the above process and characterized as having a freeze-thaw stability of at least about 4 cycles.

DETAILED DESCRIPTION

In accordance with this invention, a mixture of granular starch and a surfactant is subjected to a heat-moisture treatment in which a substantially granular starch-surfactant complex is formed. Such a starch-surfactant complex may then be blended with a gum to provide a starch-based product having excellent viscosity stability in acid systems for foodstuffs.

Heat-moisture treatment is performed by subjecting a starch-surfactant blend or mixture to a heat treatment under controlled moisture conditions such that the starch does not undergo significant gelatinization or loss of birefringence and is not dextrinized. The heat-moisture treated blend is then optionally dried. The heat-moisture treated starch product of this invention is a starch-surfactant complex which is prepared for use in such food products as sauces, gravies, soup mixes, pastas and various starch containing food mixes that are dispersed in hot or boiling water and cooked to prepare the foodstuff for consumption.

In particular, a starch food thickener product of the instant invention comprises a blend of gum and starch-surfactant complex which has an increased gelatinization temperature, improved paste stability under shear, and a reduced tendency for retrogradation, even in an acid system. When the starch is tapioca starch, the product also has excellent freeze-thaw stability.

It has now been found that the heat-moisture treated starch-surfactant complex has improved hot water dispersibility when compared to heat-moisture treated starch. Moreover, the dispersible starch product of this invention is further characterized as having an increased gelatinization temperature, improved paste stability under shear, and a reduced tendency for retrogradation.

Retrogradation is the phenomenon in which gelatinized starch molecules progressively reassociate until a fine microcrystalline precipitate forms. The retrogradation process may be accelerated by cooling a hot or warm starch paste. The process of retrogradation takes place even in the solid state; for example, in the staling of cake or bread. Retrogradation is determined by measuring the Brookfield viscosity of the paste immediately after pasting and then re-measuring the viscosity at room temperature after 3 and 24 hours. The less the viscosity change during the 3 hour and 24 hour intervals, the smaller is the degree of retrogradation.

According to this invention, granular starch must first be blended with a surfactant, such as a food emulsifier. The emulsifier may be a glyceride, preferably a mono- or di-glyceride of fatty acid. Examples of most preferable surfactants for purposes of this invention are glycerol monostearate and sodium stearoyl lactylate. Other suitable emulsifiers containing a fatty acid moiety are acceptable to the process of this invention such as palmitic or stearic fatty acids, D-glucose 3-stearate, methyl alpha-D-glucoside 6-stearate, sucrose monostearate, sorbitan tetrastearate, stearoyl-2-lactylate and alkali metal salts thereof, sodium stearoyl fumarate and the like. Examples of starches suitable to this invention include corn, tapioca, wheat, potato, rice, sago, grain sorghum and waxy maize. For a thicker paste, tapioca or potato starch is preferred.

In combining the surfactant with the granular starch, the surfactant is blended directly with the starch by suitable means, such as a mixer or dough blender. Preferably, the surfactant is dispersed in the water used to adjust the moisture level and sprayed onto the granular starch with mixing to insure uniformity. To further insure a uniform moisture level, the starch-surfactant water blend may be equilibrated prior to heat treatment.

The moisture content of the equilibrated starch-surfactant-water blend may vary from about 10% to about 40% by starch weight. The surfactant content of the blend is at least about 0.25%, can be from about 0.25% to about 5% by starch weight, and is preferably from about 0.25% to about 5% by starch weight, and is preferably from about 0.25% to about 1.0% by starch weight for improved hot water dispersibility. The surfactant content must be at least above about 0.50% by starch weight where it is desired to obtain 100% hot water dispersibility.

The equilibrated blend of starch-surfactant-water must then be heat treated by any one of several methods that provide uniform heat transfer without creating hot spots in the blend. Preferably, the heat-treatment takes place in a closed container so that moisture can be maintained at a constant level for a controlled continuous production of the heat-moisture treated starch-surfactant product at a temperature from about 50° C. to about 120° C. At a temperatures above about 120° C., undesirable degradation and dextrinization reactions begin to destroy the thickening ability of the starch. Preferably the temperature during the heat-treatment is from about 60° C. to about 90° C. for from about 3 to about 16 hours. The use of conditions, such as, for example, 35% moisture and 90° C. for 16 hours results in reduced paste viscosity of the final product, although the product dispersibility is present making the product acceptable for applications where less viscous starch products are acceptable. Variations on moisture, temperature and time within the ranges set forth herein can be made by those skilled in the art depending on the desired properties of the end product.

After heat-moisture treatment of the starch-surfactant-water blend, the product can then be dried by conventional methods to a moisture level of from about 5% to about 15% by total weight using conditions that minimize further heat treatment. Various drying procedures may be used, such as room temperature drying, forced-air oven drying, microwave drying or freeze drying. The purpose of drying is to obtain the final dried product for use which preferably has a room equilibrated dry substance content of about 90%.

As an optional step, the dried starch-surfactant product may be ground or milled by suitable means to produce a desired particle size. A particle size of less than about 250 microns is preferred for uniformity of the dried starch-surfactant product.

Although the dried heat-moisture treated starch-surfactant product readily disperses in hot or boiling water and provides a paste after cooking, its dispersion into cold water occurs without gelatinization since the product is still substantially granular in nature. The gelatinization temperature of the starch-surfactant product is higher than either native granular starch or heat-moisture treated starch without surfactant. For example, the relative pasting temperature of native tapioca stach was found to be about 58° C. Heat-moisture treatment of the same tapioca starch at 27.5% moisture at 90° C. for 7 hours resulted in a relative pasting temperature of about 68° C. Heat-moisture treatment of the same tapioca starch in the presence of 0.5% by weight monoglyceride at 27.5% moisture at 90° C. for 7 hours resulted in a relative pasting temperature of from about 80° C. to about 85° C.

Hot water dispersibility is determined by the Hot Water Dispersibility test wherein 5.00 gms. by dry weight basis of the dried heat-moisture treated starch surfactant product is placed in an insulated 200 ml tall-form beaker and 100 ml of boiling distilled water added. After mixing 15 seconds, the sample is allowed to stand 1 minute. Any agglomerated particles are then removed by washing on a 20 mesh (840 micron) screen. The agglomerated material is dried 4 hours at 120° C. at 100 mm of Hg. Hot water dispersibility is expressed as percent of non-agglomerated material that passed through the screen. Thus, a hot water dispersibility of 100% means all of the material passed through the screen and, therefore, indicates excellent dispersibility. The preferred products of this invention have a hot water dispersibility of greater than about 60% and most preferably a hot water dispersibility at or near 100%.

The dried heat-moisture treated starch-surfactant products of this invention were also characterized by determining their viscosity profile using the Visco/Amylo/Graph Viscosimeter (manufactured by C. W. Brabender Instruments Inc., Hackensack, N.J.). In this procedure, 35 gms. dry basis weight starch is dispersed into 500 ml. of cold water with uncontrolled heating to 50° C. and heated at a constant rate of 1.5° C. per minute between 50° C. to 95° C. The relative pasting temperature is the temperature at which one-half peak viscosity first develops as is recorded on the graph. After reaching 95° C., the paste is held for 30 minutes and then cooled from 95° C. to 50° C. at 1.5° C. per minute. The paste is held at 50° C. for 30 minutes. Viscosity is recorded in Brabender Units using the 700 cmg cartridge. The final Brabender paste was measured for Brookfield viscosity immediately after completion of the 30 minute hold and remeasured after a 3 hour and 24 hour hold at 25° C. using an LVF Model Brookfield Viscometer (manufactured by Brookfield Engineering Labs Inc., Stoughton, Mass.) using a No. 4 spindle at 6 rpm. The results of these tests verify the increased gelatinization temperature, improved paste viscosity stability under shear and reduced tendency for retrogradation for the heat-moisture treated starch-surfactant product of this invention.

While the inventors do not wish to be bound by any theory to explain the phenomenon of this invention, it is believed that the presence of the surfactant during the heat-moisture treatment permits a complex formation within the partially swollen starch matrix with straight chain portions of the starch molecules. The resulting unique product has greater hot water dispersibility than heretofore obtained for heat-moisture treated starch alone or for a mixture of surfactant and heat-moisture treated starch. It is further believed that the formation of the heat-moisture treated starch-surfactant complex of this invention is obtained by the limited moisture environment whereby controlled amounts of water present allow complex formation under conditions wherein the starch remains in an ungelatinized state.

After heat-moisture treatment, the starch-surfactant complex may be blended with a gum to produce an acid stable food thickener. The level of gum used is from about 0.5% to about 10% by total weight. Preferably, the level of gum should be above at least about 1% by total weight to obtain acceptable freeze-thaw stability. Preferably the starch-surfactant complex is dried to a moisture level of from about 5% to about 15% by total weight prior to blending with the gum, although this is not critical. The starch-surfactant complex or starch-surfactant complex/gum blend is then dried by conventional methods using conditions that minimize further physiochemical change of the complex by heat treatment. Various drying procedures may be used, such as room temperature drying, forced-air oven drying, microwave drying or freeze drying. The dried starch-containing thickener product of this invention, preferably has a room equilibrated dry substance content of about 90%.

For purposes of this invention, gums such as xanthan, guar, locust bean, alginate, carrageenan, ghatti, karaya and combinations thereof are blended with the starch-surfactant complex using, for example, a dough blender.

Examples of starches suitable for the acid stable product of this invention include corn, tapioca, wheat, potato, rice, sago, grain sorghum and waxy maize.

Viscosity properties are determined using the Visco/Amylo/Graph Viscosimeter C. W. Brabender Instruments Inc., Hackensack, N.J.) using a high sugar acid system. In this procedure 27.0 gms dry basis weight starch is dispersed in 450 gms by weight cold water containing 100.0 gms dry basis weight sucrose with the pH adjusted to 3.3 by addition of sufficient 10% citric acid solution and then heated to 70° C. with uncontrolled heating. It is then heated at a constant rate of 1.5° C. per minute from 70° C. to 95° C. After reaching 95° C., the paste is held for 15 minutes and then cooled at 1.5° C. per minute to 25° C. The paste is then held at 25° C. for 15 minutes. Viscosity is recorded in Brabender Units using the 700 cmg cartridge. The final Brabender paste at 25° C. is measured for Brookfield viscosity after completion of the 15 minutes holding time using a RVT Model Brookfield Viscometer (Brookfield Engineering Labs. Inc., Stoughton, Mass.) Type VSP using a No. 4 or 5 spindle at 20 rmp.

An increase in viscosity during the 95° C. hold indicates that the product has excellent acid stability. No change to a slight decrease in viscosity during the 95° C. hold indicates an acceptable acid stable product. Decreased viscosity during the 95° C. hold indicates acid instability. The preferred acid stable product has an increased viscosity during the 95° C. hold and a high final viscosity at 25° C. Preferably an increase in viscosity of from about 20 to about 400 Brabender Units during the 95° C. hold is obtained for the starch-surfactant complex and gum blends of this invention.

Paste consistency was determined with a Bostwick Consistometer (Central Scientific Co., Chicago, Ill.) using the procedures described by Davis et al., in Food Tech. 9, 13–17 (1955). In this test, the measure of consistency is the distance in centimeters over which a measured amount of material will flow in 30 seconds in an elevated trough 5 cm wide. Therefore, the values are inversely proportional to the consistency of the pastes. A consistency less than about 10 cm/30 sec. is considered good for this test. Consistencies of from about 5.0 to about 10.0 cm/30 sec. were obtained for the corn or tapioca starch-surfactant complex and gum blends of this invention.

Freeze-thaw stability is determined by placing 30 ml of the final paste from the Brabender Viscosimeter into several 50 ml centrifuge tubes. The tubes are placed in the freezer at −30° C. Each day the tubes are removed from the freezer, brought to room temperature, and then placed back into the freezer for re-freezing. This constitutes one freeze-thaw cycle. After thawing, the sample is centrifuged at 2500 rpm for 30 minutes and the volume in ml of separated liquid, if any, is recorded. Samples with 25% or more liquid separation by volume at a particular cycle are considered to have unacceptable stability. For purposes of this invention, a record of the number of cycles achieved without 25% separation occurring was recorded. Preferably at least about 4 freeze-thaw cycles are desirable and freeze-thaw stability above about 6 cycles is considered excellent. Tapioca starch-surfactant complexes and gum blends having freeze-thaw cycles of greater than about 8 with consistencies of less than about 8.5 cm/30 sec. and final viscosities of greater than about 8000 cps. at 25° C. were prepared by the process of this invention.

The invention is illustrated by the following examples which, however, are not to be taken as limiting in any respect.

EXAMPLE I

A. Moisturizing the Starch

Two samples of starch having a moisture content of 9.6% were sprayed with the required amount of water to increase the moisture content of 20% and 35% while mixing to obtain a uniform moisture content. These starch-water samples were used as controls.

Moistured starch samples with surfactant were prepared by adding glycerol monostearate to water at 70° C. and mixing to obtain a dispersion which was then cooled. Then the water-glycerol monostearate dispersion was sprayed onto starch while mixing to obtain uniformity. The amount of glycerol monostearate used was adjusted to obtain 1.0% monoglyceride level on a starch weight basis.

B. Heat Treatment 120.0 gms. on a weight basis of starch-surfactant-water blend were placed in a sealed pint jar. The jar was placed in a constant temperature water bath at the desired temperature and rotated end-over-end during the heat-treatment for the desired length of time. After heat-treatment, the jar was cooled to room temperature before opening.

C. Product Recovery

The starch-surfactant product was removed from the jar and dried at 40° C. in a forced air oven to approximately 10% moisture content.

D. Hot Water Dispersibility

Hot water dispersibility was determined as previously described using the Hot Water Dispersibility test with the following results:

| Heat Treatment Conditions | | | | |
|---|---|---|---|---|
| Monoglyceride Level % | Moisture Level % | Temp. °C. | Time Hours | Hot Water Dispersibility % |
| 0 | 20 | 60 | 3 | 28 (a) |
| 0 | 35 | 60 | 16 | 40 (b) |
| 0 | 20 | 90 | 16 | 59 (b) |
| 0 | 35 | 90 | 3 | 54 (b) |
| 1 | 20 | 60 | 16 | 38 (a) |
| 1 | 35 | 60 | 3 | 100 (b) |
| 1 | 20 | 90 | 3 | 98 (a) |
| 1 | 35 | 90 | 16 | 100 (b) |
| 1 | 35 | 90 | 16 | 100 (b) |
| 1 | 35 | 90 | 16 | 100 (b) |

(a) Dispersibility as measured on unmilled product.
(b) Product milled to a particle size less than 250 microns before dispersibility test.

These results show that heat-moisture treatment of starch-surfactant blends at 35% moisture level held for 3 to 16 hours at 60° C. to 90° C. had far superior hot water dispersibility compared to heat-moisture treated products without surfactant. In the absence of surfactant, maximum hot water dispersibility never exceeded 60%, while 98–100% dispersibility was achieved for a statistically significant sample (i.e. 5 out of 6) of products produced by heat-moisture treatment of the starch-surfactant blends.

EXAMPLE II

The effect of surfactant on hot water dispersibility is demonstrated by the following:

Heat-moisture treatment of tapioca starch was conducted at 27% moisture at 75° C. for 7 hours and 0.5% by starch weight monoglyceride using the procedure outlined in Example I and Hot Water Dispersibility was determined as previously described with the following results:

| Sample | % Mono-glyceride | Hot Water Dispersi-ability | Relative Pasting Temp. C.° |
|---|---|---|---|
| Granular (untreated) Starch | 0 | 25 | 65 |
| Granular (untreated) Starch (a) with added surfactant | 0.5 | 38 | 69 |
| Heat-Moisture Treated Starch | 0 | 50 | 70 |
| Heat-Moisture Treated Starch followed by Surfactant Addition (b) | 0.5 | 49 | 82 |
| Heat-Moisture Treated Starch followed by Surfactant Addition (a) | 0.5 | 78 | 89 |
| Surfactant Product of the Present Invention | 0.5 | 99 | 95+ |

(a) The surfactant was added to an aqueous slurry of starch with conditioning of the slurry for 4 hours at 45° C.
(b) The surfactant was sprayed onto the heat-moisture treated starch.

This comparative example shows that heat-moisture treatment of a starch-surfactant mixture provides superior hot water dispersibility and that having surfactant present during heat-moisture treatment provides much higher hot water dispersibility than simple addition of surfactant after heat-moisture treatment of starch, further illustrating the unexpected results obtained, in accordance with this invention.

EXAMPLE III

The effect of surfactant level, moisture level, heat-treatment temperature and heat-treatment time was determined on a series of heat-moisture treated products prepared according to the procedures set forth in Example I. Hot water dispersibility and Brookfield viscosity was determined as previously described with the following results:

| Heat-Moisture Treatment Conditions | | | | Brookfield Viscosity Centipoise $\times 10^{-2}$ | | | Hot Water Dispersibility % |
|---|---|---|---|---|---|---|---|
| Surfactant % by Wt. | H$_2$O % by Wt. | Temp. °C. | Time Hrs. | Time Hrs. | Time 0 | Time 24 Hrs. | |
| 0 | 20.0 | 60 | 16 | 105 | 220 | 370 | 30 |
| 0 | 20.0 | 75 | 3 | 120 | 250 | 500 | 34 |
| 0 | 20.0 | 90 | 7 | 130 | 280 | 450 | 56 |
| 0.50 | 20.0 | 60 | 3 | 142 | 194 | 160 | 34 |
| 1.0 | 19.4 | 60 | 16 | 140 | 295 | 310 | 38 |
| 1.0 | 19.8 | 75 | 7 | 175 | 170 | 180 | 88 |
| 1.0 | 19.4 | 90 | 3 | 170 | 210 | 460 | 98 |
| 1.0 | 19.8 | 90 | 16 | 145 | 200 | 250 | 100 |
| 0 | 26.9 | 75 | 7 | 155 | 369 | 897 | 50 |
| 0 | 27.5 | 90 | 7 | 160 | 351 | 513 | 58 |
| 0.25 | 27.4 | 90 | 7 | 146 | 370 | 520 | 95 |
| 0.50 | 27.3 | 75 | 7 | 165 | 230 | 337 | 99 |
| 0.50 | 27.2 | 90 | 7 | 156 | 245 | 327 | 100 |
| 0 | 35.2 | 60 | 3 | 150 | 290 | 750 | 33 |
| 0 | 34.6 | 90 | 16 | 160 | 548 | 1000 | 40 |
| 0 | 34.6 | 90 | 3 | 210 | 1000 | 1000 | 54 |
| 0.25 | 34.7 | 90 | 7 | 115 | 260 | 375 | 86 |
| 0.50 | 35.2 | 75 | 3 | 160 | 216 | 335 | 99 |
| 1.0 | 34.9 | 60 | 3 | 150 | 158 | 178 | 100 |
| 1.0 | 34.8 | 60 | 16 | 150 | 180 | 200 | 100 |
| 1.0 | 34.8 | 90 | 3 | 130 | 148 | 175 | 100 |
| 1.0 | 34.8 | 90 | 16 | 95 | 108 | 128 | 100 |

The results of these experiments again show that a heat-moisture treatment of starch without surfactant produces a maximum dispersibility of less than about 60% by weight. At low moisture levels of about 20% by total weight, higher temperatures and longer times are required to produce improved hot water dispersible products by heat-moisture treatment of the starch surfactant blend. At lower levels of surfactant of about 0.25% by starch weight, higher temperatures and longer times are likewise required to obtain desirable products. Above about 0.5% by weight surfactant, heat-moisture treatment of starch-surfactant blend produce a statistically significant number of completely dispersible products having the preferred hot water dispersibility at or near 100%.

EXAMPLE IV

The heat-moisture treated dried starch products of Example III were pasted using the Brabender Viscosimeter using the procedures previously discussed with the following results:

| Heat-Moisture Treatment Conditions | | | | Relative* Pasting Temp. °C. | Brabender Viscosity (35 g dry Wt./500 ml) Brabender Units | | | |
|---|---|---|---|---|---|---|---|---|
| Surfactant % by Wt. | H₂O % by Wt. | Temp. °C. | Time Hrs. | | Peak Viscosity | Initial Viscosity at 95° C. | Viscosity 30 min. at 95° C. | Viscosity Cooled to 50° C. |
| 0 | 19.6 | 60 | 3 | 64 | 1400 | 660 | 370 | 640 |
| 0 | 20.0 | 60 | 16 | 65 | 1300 | 760 | 370 | 600 |
| 0 | 20.0 | 75 | 3 | 66 | 1160 | 850 | 450 | 670 |
| 0 | 20.0 | 90 | 7 | 68 | 800 | 770 | 500 | 810 |
| 0.50 | 20.0 | 60 | 3 | 68 | 820 | 800 | 580 | 800 |
| 1.0 | 19.4 | 60 | 16 | 90 | 900 | 820 | 780 | 840 |
| 1.0 | 19.8 | 75 | 7 | 95 | 910 | 450 | 820 | 820 |
| 1.0 | 19.4 | 90 | 3 | 95+ | 1030 | 130 | 930 | 900 |
| 1.0 | 19.8 | 90 | 16 | 95+ | 830 | 70 | 650 | 710 |
| 0 | 26.9 | 75 | 7 | 70 | 933 | 920 | 560 | 857 |
| 0 | 27.5 | 90 | 7 | 71 | 680 | 650 | 483 | 843 |
| 0.25 | 27.4 | 90 | 7 | 74 | 530 | 400 | 380 | 670 |
| 0.50 | 27.3 | 75 | 7 | 95+ | 930 | 220 | 760 | 920 |
| 0.50 | 27.2 | 90 | 7 | 95+ | 787 | 140 | 747 | 790 |
| 0 | 35.2 | 60 | 3 | 66 | 1100 | 830 | 470 | 740 |
| 0 | 34.6 | 90 | 16 | 67 | 1040 | 900 | 510 | 780 |
| 0 | 34.6 | 90 | 3 | 71 | 1030 | 820 | 550 | 1050 |
| 0.25 | 34.7 | 90 | 7 | 74 | 530 | 400 | 380 | 670 |
| 0.5 | 35.2 | 75 | 3 | 95+ | 820 | 100 | 750 | 890 |
| 1.0 | 34.9 | 60 | 3 | 95+ | 880 | 60 | 810 | 840 |
| 1.0 | 34.8 | 60 | 16 | 95+ | 820 | 40 | 800 | 800 |
| 1.0 | 34.8 | 90 | 3 | 95+ | 760 | 40 | 760 | 690 |
| 1.0 | 34.8 | 90 | 16 | 95+ | 583 | 33 | 540 | 490 |

*Temperature at which one-half peak viscosity develops while heating from 50°–95° C.
95+ indicates that viscosity develops during the 95° C. hold.

These results demonstrate that heat-moisture treatment raises the gelatinization temperature and that heat-moisture treatment of the starch-surfactant blend produces a product having a much higher relative pasting temperature. Moreover, a comparison of this data with the data from Example III shows that the products of this invention having 100% hot water dispersibility require a hold at 95° C. before appreciable viscosity develops, further demonstrating the unique properties of the dried heat-moisture treated starch-surfactant product which makes it suitable for dispersion directly in hot or boiling water and for other food applications requiring a starch product with retarded gelatinization characteristics.

EXAMPLE V

A. Moisturizing the Starch

Tapioca starch having a moisture content of 9.6% was sprayed with the required amount of water to increase the moisture content to 25% by total weight while being mixed to obtain a uniform moisture content. These starch-water samples were used as controls.

Moisturized starch samples with surfactant were prepared by spraying an aqueous dispersion of sodium stearoyl lactylate onto starch while mixing to obtain uniformity. The amount of sodium stearoyl lactylate used was adjusted to obtain a 5% monoglyceride level on a starch weight basis.

B. Heat Treatment 125 gms. dry basis weight of starch-water or starch-surfactant water blend was placed in a sealed pint jar. The jar was placed in a constant oven at 90° C. and manually shaken every 15 minutes during the heat-treatment for the desired length of time. After heat-treatment, the jars were cooled to room temperature before opening.

C. Drying

The heat-moisture treated starch or starch-surfactant product was removed from the jars and dried at 40° C. in a forced air oven to approximately 10% moisture content and then ground in a Waring Blender for about 30 seconds before blending with the gum.

D. Blending 95 gms of the dried heat-moisture treated starch or starch-surfactant complex was mixed with 5.0 gms. of one or more natural gums and the viscosity stability determined using the acid-sugar system and freeze-thaw stabilities were determined for tapioca starch with the following results:

| Sample | Viscosity Stability B.U. at 95° C. 0 min. | Viscosity Stability B.U. at 95° C. 15 min. | Final Paste Viscosity cps. at 25° C. | Freeze Thaw Cycles* | Paste Consistency cm/30 sec. |
|---|---|---|---|---|---|
| Starch | 320 | 210 | 2500 | 6 | 18.0 |
| Starch-Surfactant Complex | 190 | 370 | 6400 | 2 | 8.5 |
| Starch-Surfactant Complex plus 5.0% Xanthan Gum | 266 | 560 | 7900 | 10 | 6.0 |
| Starch-Surfactant Complex plus 5.0% Locust Bean Gum | 150 | 640 | 11500 | 4 | 7.0 |
| Starch-Surfactant Complex plus 5.0% Guar Gum | 550 | 800 | 13000 | 8 | 7.0 |
| Starch-Surfactant Complex plus 2.5% Xanthan Gum | 600 | 570 | 12000 | 8 | 5.0 |

|                                                                 | Viscosity Stability B.U. at 95° C. | | Final Paste Viscosity cps. | Freeze Thaw | Paste Consistency |
| --- | --- | --- | --- | --- | --- |
| Sample                                                          | 0 min. | 15 min. | at 25° C. | Cycles* | cm/30 sec. |
| and 2.5% Locust Bean Gum                                        |        |         |           |         |           |
| Starch-Surfactant Complex plus 2.5% Xanthan Gum and 2.5% Guar Gum | 450    | 810     | 10600     | 10      | 6.0       |

*Maximum cycles below 25% liquid separation

These results show that all blends of tapioca starch-surfactant complex and gum have superior freeze-thaw stabilities of at least about 4 cycles, high viscosities, improved acid viscosity stability at 95° C. and improved consistencies of from about 5.0 to about 7.0 cm/30 sec. In comparison, untreated tapioca starch and good freeze-thaw stability but poor viscosity stability at 95° C. and low final paste viscosity. The control starch-surfactant complex had slightly higher viscosity than the untreated starch but had the lowest freeze-thaw stability. High freeze-thaw stabilities of greater than 6 cycles were unexpectedly obtained for the starch-surfactant complex/gum blends without loss of viscosity in the acid-sugar system thus demonstrating the unexpected features of this invention.

EXAMPLE VI

The procedures set forth in Example V were followed except that corn and potato starches were used for comparison to tapioca starch with the following results:

CORN STARCH

|                                                                 | Viscosity Stability B.U. at 95° C. | | Final Paste Viscosity cps. | Freeze Thaw | Paste Consistency |
| --- | --- | --- | --- | --- | --- |
| Sample                                                          | 0 min. | 15 min. | at 25° C. | Cycles* | cm/30 sec. |
| Starch                                                          | 340 | 300 | 4300 | 2 | 10.0 |
| Starch-Surfactant Complex                                       | 190 | 200 | 6200 | 2 | 6.5 |
| Starch-Surfactant Complex plus 5.0% Xanthan Gum                 | 620 | 600 | 9300 | 2 | 5.0 |
| Starch-Surfactant Complex plus 2.5% Guar Gum and 2.5% Xanthan Gum | 240 | 500 | 9300 | 2 | 5.5 |

*Maximum cycles below 25% liquid separation

POTATO STARCH

|                                                                 | Viscosity Stability B.U. at 95° C. | | Final Paste Viscosity cps. | Freeze Thaw | Paste Consistency |
| --- | --- | --- | --- | --- | --- |
| Sample                                                          | 0 min. | 15 min. | at 25° C. | Cycles* | cm/30 sec. |
| Starch                                                          | 660 | 380 | 4100 | 6 | 14.0 |
| Starch-Surfactant Complex                                       | 100 | 140 | 300  | 2 | 24+  |
| Starch-Surfactant Complex plus 5.0% Guar Gum                    | 120 | 220 | 6000 | 2 | 10.0 |
| Starch-Surfactant Complex plus 2.5% Guar Gum and 2.5% Xanthan Gum | 100 | 210 | 4200 | 2 | 11.0 |

*Maximum cycles below 25% liquid separation

These comparative results show that a blend of gum with either a corn starch-surfactant complex or a potato starch-surfactant complex clearly failed to provide acceptable freeze-thaw stability further demonstrating the superiority of the gum and tapioca starch-surfactant blend of Example V. These results also demonstrate that an excellent acid stable starch based food thickener can be made from starches such as corn or potato which would have value in food systems where freeze-thaw stability is not required.

EXAMPLE VII

In a comparative experiment, to further demonstrate that heat-moisture treatment of a tapioca starch-surfactant complex provides superior results, a heat-moisture treated starch was prepared as in Example V for a starch-water sample in which no surfactant was present during the heat-moisture treatment. To this heat-moisture treated starch, surfactant and gum were added and viscosity properties determined using the Visco/Amylo/Graph Viscometer and the results compared to heat-moisture treated starch-surfactant complex with the following results:

LOCUST BEAN GUM

| Sample | Viscosity Stability B.U. at 95° C. | | Final Paste Viscosity cps. | Paste Consistency cm/30 sec. |
| --- | --- | --- | --- | --- |
|                                   | 0 min. | 15 min. | at 25° C. |      |
| Starch                            | 420 | 280 | 3800  | 15.5 |
| Starch plus Surfactant            | 360 | 280 | 3800  | 12.0 |
| Starch plus Surfactant plus 5.0% Locust Bean Gum | 240 | 270 | 5300  | 11.0 |
| Starch-Surfactant Complex         | 190 | 370 | 6400  | 8.5  |
| Starch-Surfactant Complex Complex plus 5.0% | 150 | 640 | 11500 | 7.0 |

LOCUST BEAN GUM

| Sample | Viscosity Stability B.U. at 95° C. 0 min. | 15 min. | Final Paste Viscosity cps. at 25° C. | Paste Consistency cm/30 sec. |
|---|---|---|---|---|
| Locust Bean Gum | | | | |

XANTHAN GUM/GUAR GUM

| Sample | Viscosity Stability B.U. at 95° C. 0 min. | 15 min. | Final Paste Viscosity cps. at 25° C. | Paste Consistency cm/30 sec. |
|---|---|---|---|---|
| Starch | 420 | 280 | 3800 | 15.5 |
| Starch plus Surfactant | 360 | 280 | 3800 | 12.0 |
| Starch plus Surfactant plus 2.5% Xanthan Gum plus 2.5% Guar Gum | 630 | 660 | 6900 | 10.0 |
| Starch-Surfactant Complex | 190 | 370 | 6400 | 8.5 |
| Starch-Surfactant Complex plus 2.5% Xanthan Gum plus 2.5% Guar Gum | 450 | 810 | 10600 | 6.0 |

These results demonstrate the heat-moisture treatment of a starch and surfactant blend results in a heat-moisture treated starch-surfactant complex having superior viscosity stability when pasted in an acid system and improved paste consistency not achieved by heat treatment in the absence of a surfactant.

While the invention has been described in connection with specific embodiments thereof, it will be understood that it is capable of further modifications. The application is intended to cover any variations, uses or adaptations of the invention and including such departures from the present disclosure as come within known or customary practice in the art to which this invention pertains as may be applied to the essential features hereinbefore set forth, and as fall within the scope of the invention.

What is claimed is:

1. A process for preparing a hot-water dispersible starch-surfactant product which process comprises
   (a) combining and mixing to form a uniform, semi-moist granular starch and surfactant mixture
      (i) a starch component comprising granular tapioca starch,
      (ii) a surfactant component comprising at least one surfactant containing a fatty acid moiety, the proportion of said surfactant component being at least about twenty-five one-hundredths of a percent (0.25%) by weight of said starch component, and
      (iii) moisture in the amount of ten percent (10%) to about forty percent (40%) by weight of the mixture, any portion of which moisture may be present as moisture content of said starch component;
   (b) heat treating said mixture at a temperature from 50° C. to about 120° C. for a sufficient period of time to produce a heat-moisture treated starch-surfactant product; and
   (c) blending said heat-moisture treated starch-surfactant product with a gum component comprising at least one gum selected from the group comprising xanthan, guar, locust bean, alginate, carrageenan, ghatti and karaya, wherein said gum component comprises from five-tenths of one percent (0.5%) to about ten percent (10%) by total weight of the starch surfactant product.

2. The acid stable starch product produced by the process of claim 1 characterized as having an increase in viscosity during a 15 minute hold period at 95° C. of from about 20 to about 500 Brabender Viscosity Units when pasted in a high sugar acid system at 6% starch solids, a Bostwick consistency of from about 5 to about 10 cm/30 sec. and a freeze-thaw stability of at least about 4 cycles.

3. The acid stable starch product of claim 2 characterized as having a freeze-thaw stability of at least about 6 cycles.

4. The acid stable starch product of claim 3 further characterized as having an increase in viscosity during a 15 minute hold period at 95° C. of from about 20 to about 500 Brabender Viscosity Units when pasted in a high sugar acid system at 6% starch solids and a Bostwick consistency of less than about 8.5 cm/30 sec.

5. The acid stable starch product of claim 4 further characterized as having a freeze-thaw stability of about 10 cycles and a Bostwick consistency of from about 7.0 cm/30 sec.

* * * * *

UNITED STATES PATENT AND TRADEMARK OFFICE
CERTIFICATE OF CORRECTION

PATENT NO. : 4,491,483

DATED : January 1, 1985

INVENTOR(S) : Wayne E. Dudacek, David A. Kochan, Henry F. Zobel

It is certified that error appears in the above-identified patent and that said Letters Patent are hereby corrected as shown below:

```
Column 3, line 10, "hot, water" should read --hot-water--.
Column 5, line 15, after the word "At" delete "a".
Column 9, line 51, "Dispersibility" should read --Dispersibility %--.
Column 10, line 12, "was" should read --were--.
Column 10, table, delete the line above "Hot Water Dispersibility %".
Column 10, table, Brookfield Viscosity section, "Time Hrs" should read
   --Time 0--.
Column 10, table, Brookfield Viscosity section, "Time 0" should read
   --Time 3 Hrs--.
Column 12, line 30, "5%" should read --0.5%--.
Column 13, line 16, "and" should read --had--.
```

Signed and Sealed this

Fifteenth Day of October 1985

[SEAL]

Attest:

Attesting Officer

DONALD J. QUIGG

Commissioner of Patents and Trademarks—Designate